(No Model.)
J. R. CHRISTIAN.
VEHICLE BRAKE.
No. 538,768. Patented May 7, 1895.
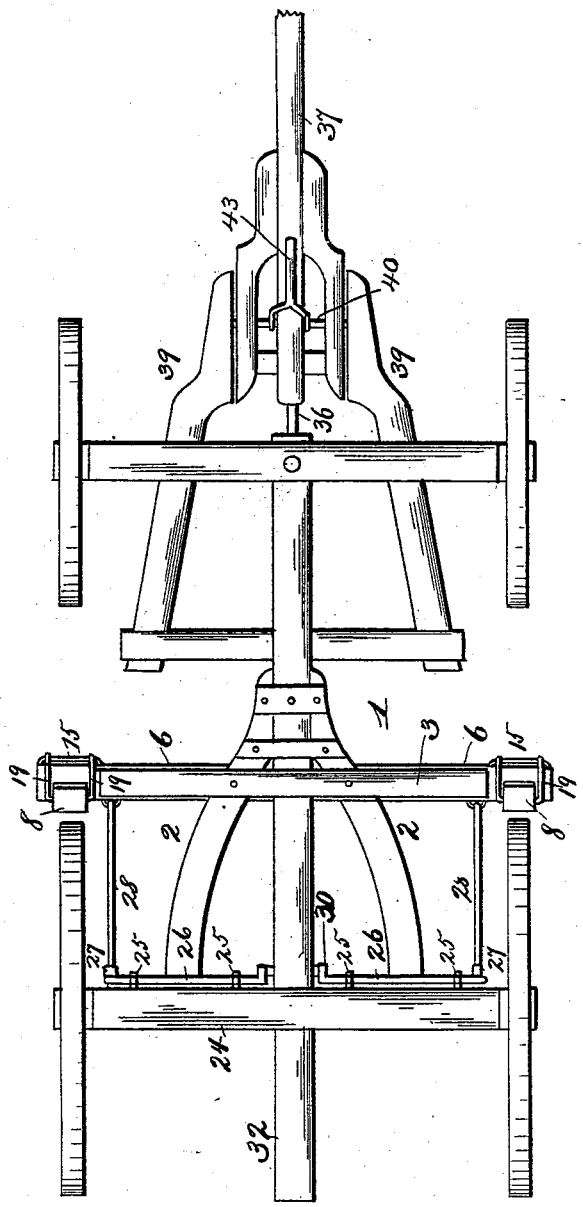
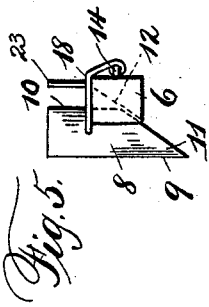
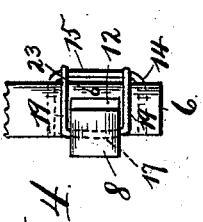
Witnesses:
H. K. Boulter
C. S. Northrup
Inventor:
John R. Christian
by his attorney Wm. E. Boulter (No Model.) 2 Sheets—Sheet 2.
J. R. CHRISTIAN.
VEHICLE BRAKE.
No. 538,768. Patented May 7, 1895.
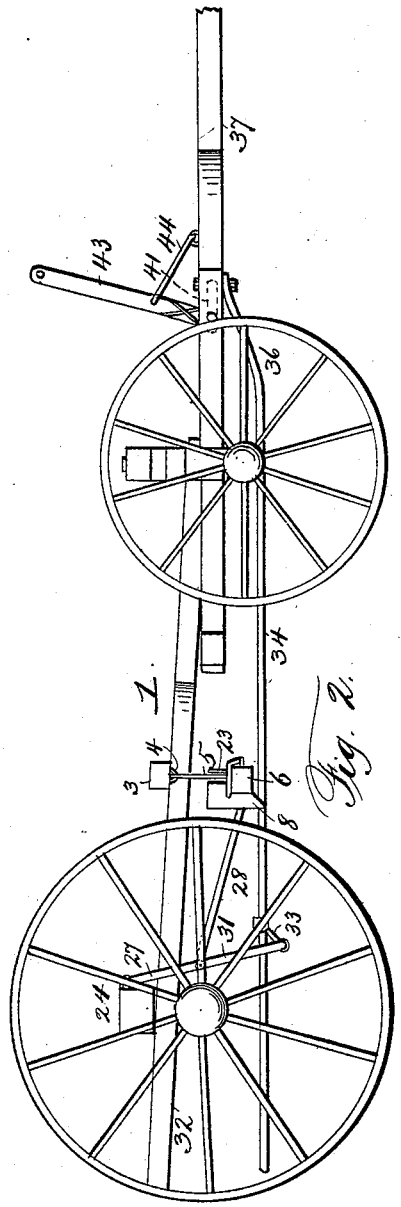
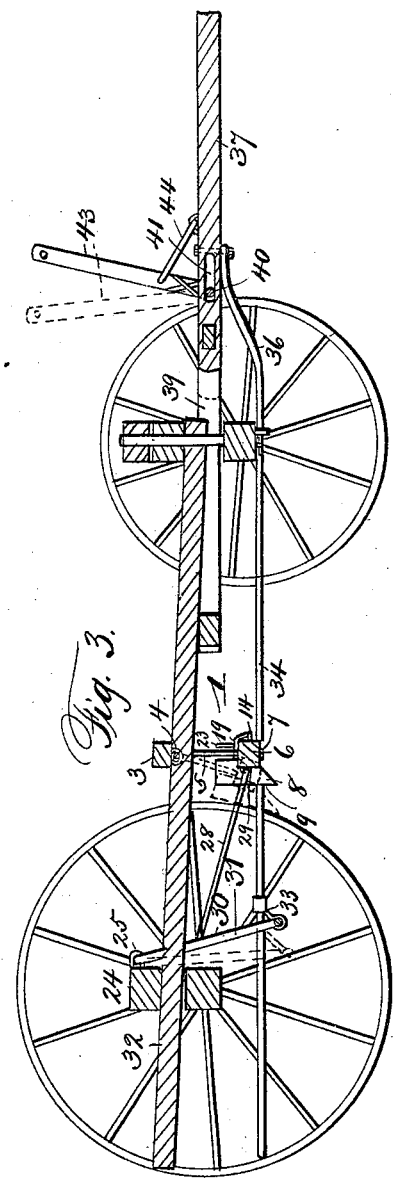
Witnesses:
H. K. Boulter
C. L. Northup
Inventor:
John R. Christian,
by his attorney
Wm. E. Boulter.
THE NORRIS PETERS CO., PHOTO-LITHO., WASHINGTON, D. C.

UNITED STATES PATENT OFFICE.

JOHN R. CHRISTIAN, OF TYLER, TEXAS.

VEHICLE-BRAKE.

SPECIFICATION forming part of Letters Patent No. 538,768, dated May 7, 1895.

Application filed June 13, 1893. Renewed November 6, 1894. Serial No. 528,091. (No model.)

*To all whom it may concern:*

Be it known that I, JOHN R. CHRISTIAN, a citizen of the United States, residing at Tyler, in the county of Smith and State of Texas, have invented certain new and useful Improvements in Vehicle-Brakes; and I do hereby declare the following to be a full, clear, and exact description of the invention, such as will enable others skilled in the art to which it appertains to make and use the same.

My invention has relation to automatic vehicle brakes, and it consists in the novel construction, arrangement and combination of parts, as hereinafter more fully described, illustrated in the accompanying drawings, and pointed out in the appended claims.

The primary object of my invention is to provide an automatic vehicle brake which is extremely simple and inexpensive in construction, and efficient in operation.

A further object is to arrange the brake shoes so that when applied they will bear on the wheels slightly below a point on a line drawn horizontally through the center of the wheel, whereby a greater brake power is obtained with less force exerted, and further, to so construct and arrange the brake shoes that during the backing of a team for any purpose the brakes will automatically release themselves and not bear upon the wheels to interfere with said backing.

Other objects and advantages of my invention will appear hereinafter.

In the drawings, Figure 1 is a plan view of the running-gear of a vehicle with my improved brake mechanism attached thereto; Fig. 2, a side view of the same; Fig. 3, a sectional view on the line $x\,x$ of Fig. 1. Figs. 4 and 5 are enlarged detail views of the brake shoe and beam.

Referring to the above-described drawings, in which like numerals of reference indicate like parts in all the figures of the drawings, 1 designates the running gear of the vehicle of the usual well known construction, to the rear hounds 2 of which is secured transversely a bar 3, provided near each end with a suitable fastening 4, from which depend rods 5, whose lower ends pass through the brake beam 6, arranged transversely and having nuts 7 on their lower ends.

8 designates the brake shoes having their rear or wearing faces 9 perfectly flat, while their front faces 10 for a portion of their way are angularly disposed forming at their lower ends wedge-shaped portions 11.

Near each end of the brake beam 6 are formed recesses 12, the bottom walls of which are beveled downwardly and rearwardly toward the rear wheels, within which recesses are designat to fit and work the wedge-shaped ends of the brake shoes.

Formed in the brake beam at each side of the recesses 12 are openings through which are passed the ends of a U-shaped tie or bail 14, the portion 15 of which runs parallel with the rear face of the brake beam and through the brake shoes pass the arms 17 of hangers 18. The ends of said arms are bent to form eyes through which pass the portions 15 of the keepers 14.

To limit the upward movement of the brake shoes and prevent them from getting out of position during the backing of the team, I employ stops 23 which rise from the upper face of the brake beam.

To the rear bolster 24 is hung by means of screw eyes 25 a crank lever or shaft 26 which is provided at each end with downwardly extending arms 27 provided in their ends with eyes in which are secured one end of connecting rods 28 their opposite ends being secured to the brake beam by means of screw eyes 29. The lever 26 is bent at its central portion to form a crank 30, the arms 31 of which pass downwardly at each side of the reach or coupling pole 32, and carries a swiveled clamp 33 through which passes a rod 34 arranged longitudinally of the vehicle, the front end of said rod being pivoted to the rear end of a rod 36 immediately below the front axle, said rod 36 being pivoted at its front end to the under side of the tongue 37. The rod 36 passes through a keeper 38 secured to the under side of the front axle.

It will be seen that by providing the rod 36 and pivoting the rod 34 thereto, when the tongue and front axle are turned to either side the said rod 36 is free to turn with said parts, that is to say, it will remain always in line with the tongue without disturbing the longitudinal arrangement of the rod 34.

39 designates the front hounds provided with a fixed transverse rod 40 which passes through elongated slots 41 formed in the tongue 37, and 43 designates a lever, the lower bifurcated portion of which is pivoted upon the rod 40 and said lever extends vertically upward at about a right angle to the tongue and is held in such position by means of a rod or link 44 pivoted to the lever at one end and to the tongue 37 at its opposite end. If desired a rope or chain may be secured to the upper end of the lever and led back and secured in a convenient position to the body of the vehicle, so that the brakes may be applied by hand when desired; or the lever itself may be provided with a rearward extension for the same purpose.

The operation of my invention may be briefly described as follows:—In descending grades and the team pulling back on the tongue the latter will, owing to the arrangement of the rods 35, 36, and lever 26, and connecting rods 28 cause the brake beam to swing or be pushed rearwardly causing the brake shoes to bear upon the wheels with greater or less force, according to the force with which the tongue is drawn back and thus partially check the descent of the vehicle. The brakes may also be applied by pulling rearwardly the lever 43 which causes the tongue to be drawn rearwardly to effect the desired object above set forth. This operation of the lever may be resorted to should the team at any time attempt to run away. Should it be desired to back the team for any purpose the brake shoes owing to their pivotal and hinged connection and the slotted tongue would allow the brakes to be set and prevent the backing of the team. This difficulty is avoided by swinging the brake shoes in the manner described and making their lower ends wedge shaped, and as the team is backed the brake shoes are caused to rise until they strike the stops 23 and when in this position the wheels are free to turn.

The advantages resulting from the use of my improved brake will be readily apparent from the foregoing description when taken in connection with the accompanying drawings.

What I claim, and desire to secure by Letters Patent, is—

1. The combination with a vehicle, of a tongue adapted to be moved longitudinally and provided with a slot or opening a fixed shaft 40 passing through said slot, an operating lever 43 forked at its lower end to embrace the tongue and pivoted upon the said shaft, a rod or link 44 pivoted at its ends to the lever and tongue, a rod 34 arranged longitudinally of the vehicle, a rod 36 pivoted at its opposite ends to the rod 34 and the under side of the tongue, a clamp 33 to which the rear end of the rod 34 is connected, a shaft 26 pivoted to the vehicle and provided with a crank portion 30 to which said clamp 33 is connected depending arms 27 at the ends of the shaft 26, rods 28 jointed at one end to said arms 27, a brake beam 6 to which the opposite ends of the rods 28 are jointed, and brake shoes jointed to the said beam, all arranged for cooperation, as and for the purpose specified.

2. In a vehicle brake, the combination with the brake beam 6, provided with recesses 12 having their bottom walls beveled or inclined, of the brake shoes 8 having the wedge-shaped lower portions 11, the rear faces of which are adapted to lie against the inclined bottom walls of recesses 12, a bail 14 secured to each of the brake shoes, hangers 18 passing loosely through the brake shoes, the arms of said hangers being pivotally connected to the bails 14, and vertical stop pins 23 secured to the beam 6 and adapted to limit the upward movement of the brake shoes, as and for the purpose specified.

In testimony whereof I affix my signature in presence of two witnesses.

JOHN R. CHRISTIAN.

Witnesses:
H. J. McINTOSH,
I. N. CROSS.